Jan. 4, 1938. M. REYNOLDS Re. 20,612
CONTROL FOR AUTOMATIC AIR BRAKE APPARATUS
Original Filed April 12, 1934
Fig. 1
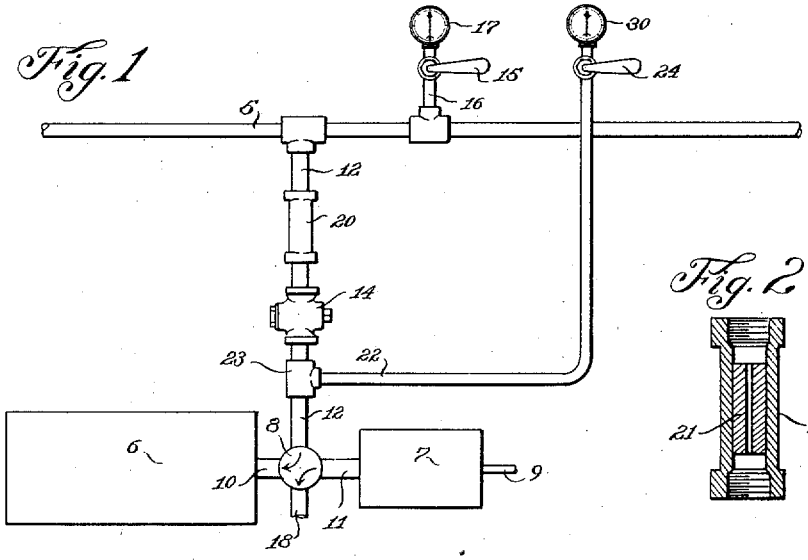
Fig. 2
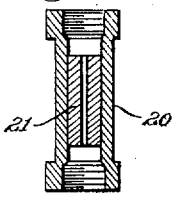
Fig. 3
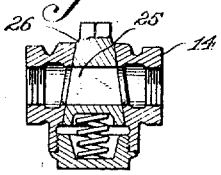
Fig 6
Fig. 4
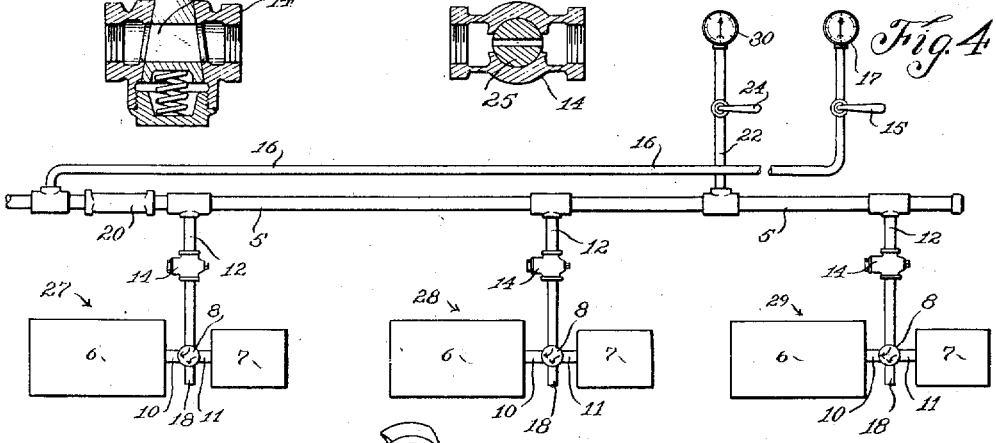
Fig. 5
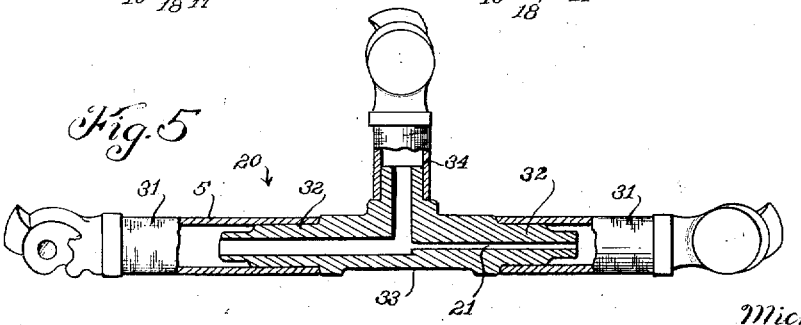
Inventor;
Michael Reynolds
By Jones, Addington, Ames & Seibold
Attys.

Reissued Jan. 4, 1938

Re. 20,612

UNITED STATES PATENT OFFICE 20,612

CONTROL FOR AUTOMATIC AIR BRAKE APPARATUS

Michael Reynolds, Ottumwa, Iowa

Original No. 1,992,443, dated February 26, 1935, Serial No. 720,171, April 12, 1934. Application for reissue September 26, 1935, Serial No. 42,310

9 Claims. (Cl. 303—47)

This invention relates to automatic air brake apparatus, and more particularly to a new and improved form of control for the air brake apparatus of a train to overcome the running in and out of slack on down or up grade travel.

It is generally understood that trains will develop slack, particularly on down grade travel, and that this is especially true if the train is of considerable length. The difficulty of handling the train, the strain upon the equipment, and the resultant damage to freight and danger of injury to passengers and train men, make it desirable to avoid slack.

It is the purpose of this invention, therefore, to provide a control for the air brake apparatus, which is simple, inexpensive, and capable of ready adoption to the equipment now in use, and which may be operated preferably at the rear end of the train for applying the braking power thereto, say to the end or a number of end cars, so that the train may be held taut from end to end on down grade travel.

It is a further object of the invention to provide as a part of the aforesaid control, which may be associated with the train line, means for restricting or controlling the flow of air to the air brake apparatus on the rear end car or cars, so that upon release of this air and the operation thereby of the triple valve to admit the air stored in the auxiliary reservoir into the brake cylinder for braking, the reduced pressure will be ineffective to reduce the train line pressure sufficiently to apply the brakes of the remaining cars.

Further objects and advantages of the present invention will be apparent to those skilled in the art from the following detailed description, taken in connection with the accompanying drawing.

Figure 1 illustrates diagrammatically the control embodying the present invention as applied to the rear end car only of a train;

Fig. 2 is a longitudinal sectional view of a connection employed to reduce the air pressure to this rear end car;

Fig. 3 is a sectional view of a modified form of cut-off valve that may employ said restriction;

Fig. 4 is a diagrammatic illustration similar to Fig. 1, but illustrating the control embodying the present invention as applied to a number of rear end cars;

Fig. 5 is a detail view of a modified form of hose connection incorporating the aforesaid restriction; and Fig. 6 is a horizontal sectional view taken on line 6—6 of Fig. 3.

Referring more particularly to the control apparatus disclosed in Figure 1 of the drawing, a pipe connection 5 may be the usual train line provided in air braking systems and receiving its supply from the usual source provided, such as a compressor or a number of compressors carried as part of the operating equipment of the train. Due to the fact that the brake mechanism of each car may be of standard construction and well known to those skilled in the art, I have only diagrammatically illustrated the same in the drawing, a brief explanation thereof only being necessary to a full and comprehensive understanding of the present invention. An auxiliary reservoir 6 and a brake cylinder 7 are usually structurally interconnected by a triple valve 8, the function of which is to admit air from the auxiliary reservoir 6 into the brake cylinder 7 to apply the brakes and thereafter to exhaust this air from the brake cylinder 7 to atmosphere to release the brakes. The brakes are represented generally by the brake rod 9 connecting with the usual interconnecting elements applying the pressure to the brakes at the wheels. For purposes of illustration, and to simplify the principle of operation of the invention herein disclosed, the pipes 10 and 11 are shown as connecting the auxiliary reservoir 6 and the brake cylinder 7 to the triple valve 8. A pipe connection 12 extends from train line 5 to the triple valve 8. The usual shut-off valve 14 may be furnished in connection 12 to shut off the pressure from the train line 5 to the brake mechanism.

When it is desired to apply the brakes, either for service or emergency operation, the train line pressure is reduced. For emergency operation of the brakes, the usual hand-operated valve 15 connected in the train line 5 by means of a pipe 16 is turned to its release position in order to exhaust the air from train line 5. Emergency valve 15 is usually located in the train line 5 at any suitable point, and quite often in the caboose or in any other car of a freight train. A freight train is referred to in the particular application of the present invention due to the considerable length thereof and the tendency of slack to develope when trains of such length run on a down grade. A pressure gauge 17 is provided in connection with emergency valve 15 to indicate the pressure of pipe line 5.

Actuation of emergency valve 15 reduces the pressure in train line 5, as aforesaid, whereby the triple valve 8 functions in the usual and well known manner to discharge air in auxiliary reservoir 6 into the brake cylinder 7 to apply the brakes indicated generally at 9. When the train line pressure is restored, the triple valve 8 operates to restore the air pressure in the auxiliary reservoir 6 and to exhaust the air from the brake cylinder 7 to atmosphere, through say a pipe 18, as indicated by the arrow shown in Figure 1.

In order to apply the brakes of the end car, say the caboose or other car or cars of a freight train, as contemplated by my invention, I propose incorporating a connection 20 in the pipe 12, which has a restricted opening 21 therein, as indicated in Figure 2. The purpose of restriction 21 will be presently described. A second connection 22 is connected at 23 to pipe 12 and may run to the caboose or other car of the train, being provided with a hand-operated valve 24, which exhausts the air to atmosphere, to reduce the pressure in the pipe 12 below (or beyond) the connection 20. I find by providing this connection 20 with a restriction 21 therein, that does not exceed the flow capacity of the locomotive brake pipe feed valve, that the sudden reduction of pressure obtained by the operation of hand valve 24 causes the triple valve 8 to actuate with sufficient promptness to effect the application of the brakes 9 without affecting the pressure in train line 5. Moreover, the brakes of this rear end car may remain applied to cause a drag on the train and thereby eliminate the building up of slack in the train without a resultant loss of pressure in train line 5 sufficient to effect the application of the brakes of the other cars. The restriction 21 may be so proportioned with respect to the pressure capacity of the air brake mechanism that sufficient air will pass therethrough to actuate the triple valve 8, under normal conditions of operation. Again, the restriction may be so proportioned that if the brakes 9 are allowed to remain applied to effect a drag at the end of the train to overcome slack, through the operation of hand valve 24, the loss of pressure will not be sufficient to effect a reduction of the train line pressure to apply the brakes of the other cars.

As a modified application of restriction 21 in connection 20 shown in Figs. 1 and 2, I may construct the shut-off valve 14 so that it will be provided with a reduced opening 25 extending through the valve body 26, instead of the usual opening providing continuity of flow therethrough when in open position. This reduced opening will permit the flow of only sufficient air to allow release thereof upon application of the brakes by actuation of hand valve 24. In the event it is desirable to disconnect the brake mechanism of this rear end car from the rest of the system, the shut-off valve 14 may be turned to off position in the usual manner.

Figure 4 illustrates my invention as applied to a number of rear end cars, or any number of other cars, when found desirable, of a train which may have their brakes applied to effect a drag on the train and thereby avoid slack on down grade traveling. The brake mechanism of these cars are represented generally as 27, 28, 29, etc. In this form of application of the invention, the connection 20, having the restricted passage 21, is preferably inserted ahead of the connection 12 of the first car of the number thus selected. The emergency valve 15 has its connection 16 inserted in the train line 5 forwardly of connection 20 so that an emergency application of hand valve 15 will reduce the train line pressure to apply the brakes of all the cars of the train, including those cars on either side of the connection 20. This arrangement permits the connection of the valve 24 directly to the train line 5, but beyond or on the opposite side of connection 20.

It will be understood that both hand valves 15 and 24 may be located in the same car or in different cars of the train. The pressure gauge 17 will indicate the pressure of the train line 5, while the pressure gauge 30 will indicate the pressure beyond the connection 20.

Figure 5 illustrates how connection 20 with its restriction 21 may be incorporated in a hose connection of the air brake system. This hose connection, designated as 31, has connection 20 inserted therein, by being split at its center. The ends 32 of connection 20 are inserted in the split hose parts while the intermediate portion 33 carrying the ends 32 is provided with a reduced connection 34 acting as an extension to which the co-operating hose connection may be attached. The reduced connection 34 is continued as the train line, the connection 16 being connected thereto, if so desired, while the restriction 21 will be provided in one of the ends 32 as shown.

It will be thus apparent to one skilled in the art how connection 20, with its restriction 21, may be incorporated in the train line 5 in various ways.

From the foregoing description, it will be apparent that the improvement herein provided is simple and does not require a revision or reconstruction of the air brake mechanism used at the present time on trains. Not only will draw bars or other equipment heretofore destroyed by slack be protected, but also the passengers and trainmen who have been injured frequently in the past when the train would run out of slack. Quite often lighter cars in the intermediate portions of the train have been demolished by being derailed and crushed by the weight of the heavier cars when they tend to pile up as the train runs in and out of slack. Moreover, carriers suffer great losses each year from damaged freight caused by the severe jolting which the cars experience when slack occurs.

Without further elaboration, the foregoing will so fully explain the gist of my invention that others may, by applying current knowledge, readily adopt the same for use under varying conditions of service, without eliminating certain features which may properly be said to constitute the essential items of novelty involved, which items are intended to be defined and secured to me by the following claims.

I claim:

1. In an automatic air brake system, the combination with a train line and the brake mechanism of individual cars of a train, means for restricting the flow of air from said train line to said brake mechanism of one or more cars, and means for reducing the air pressure between said restricting means and said brake mechanism of said one or more cars to actuate said brake mechanism without actuating the brake mechanism of the other cars of the train.

2. In an automatic air brake system, the combination with a train line and the brake mechanism of individual cars of a train, means for effecting a reduced flow of air from said train line to said brake mechanism of at least one of the cars of the train, and a relief valve for exhausting the reduced flow of air to actuate said brake mechanism.

3. In an automatic air brake system, the combination with a train line and the brake mechanism of individual cars of a train, means for effecting a reduced flow of air from said train line to said brake mechanism of at least one of the cars of the train, and a relief valve on each side of said air reducing means, one of said relief valves exhausting the full air pressure from said train line to effect an emergency application of the brake mechanism of all the cars of said train, the other relief valve exhausting the reduced air pressure to effect a controlled application of said brake mechanism of said one train car.

4. In an automatic air brake system, the combination with a train line and the brake mechanism of individual cars of a train, a pipe between said train line and said brake mechanism of at least one of the cars of the train, a connection in said pipe providing a reduced flow of air therethrough, and two valve exhausting control members, one provided on each side of said connection whereby selectively to exhaust the air in said train line or the reduced air flowing through said connection.

5. In an automatic air brake system, the combination with a train line supplying air at full pressure and the brake mechanism of individual cars of a train controlled by the air supplied by said train line, means for effecting a controlled application of the brake mechanism of at least one of the cars of the train, said means including pressure releasing means to actuate said brake mechanism and restrictive means to permit actuation of said brake mechanism, while said releasing means is open, without effecting a loss of pressure in said train line sufficient to effect a reduction of said train line pressure to actuate the brake mechanisms of the other cars.

6. In an air brake system, the combination with a train line and the brake mechanism of individual cars of a train, and control mechanism for effecting a controlled application of the brake mechanism of at least one of the cars of the train, said control mechanism including pressure releasing means to actuate said brake mechanism and restrictive means to permit actuation of said brake mechanism without actuating the brake mechanism of the other cars while said pressure releasing means is open.

7. In an automatic air brake system, the combination with a train line supplying air at full pressure and the brake mechanism of individual cars of a train controlled by the air supplied by said train line, and control mechanism for effecting a controlled application of the brake mechanism of at least one of the cars of the train, said control mechanism including means to actuate said brake mechanism and restrictive means to permit actuation of said brake mechanism without a loss of pressure in the said train line sufficient to actuate the brake mechanism of the other cars.

8. In an automatic air brake system, the combination with a train line supplying air at full pressure and the brake mechanism of individual cars of a train controlled by the air supplied by said train line, a valve for leasing air to actuate the brake mechanism of at least one of the cars of the train, and a restricted passage communicating with said train line to permit actuation of said brake mechanism without effecting a reduction in said train line pressure sufficient to actuate the brake mechanism of the other cars.

9. In an automatic air brake system, the combination with a train line supplying air at full pressure and the brake mechanism of individual cars of a train controlled by the air supplied by said train line, a valve for releasing air to actuate the brake mechanism of at least one of the cars of the train, and a connection between said train line and said brake mechanism having restrictive means to permit actuation of said brake mechanism without effecting a reduction of pressure in said train line which will actuate the brake mechanism of the other cars while said air releasing valve is open.

MICHAEL REYNOLDS.